P. HOCHSTRASSER.
AIR SHIP.
APPLICATION FILED JULY 19, 1907. RENEWED JUNE 11, 1908.
910,683.
Patented Jan. 26, 1909.
3 SHEETS—SHEET 3.
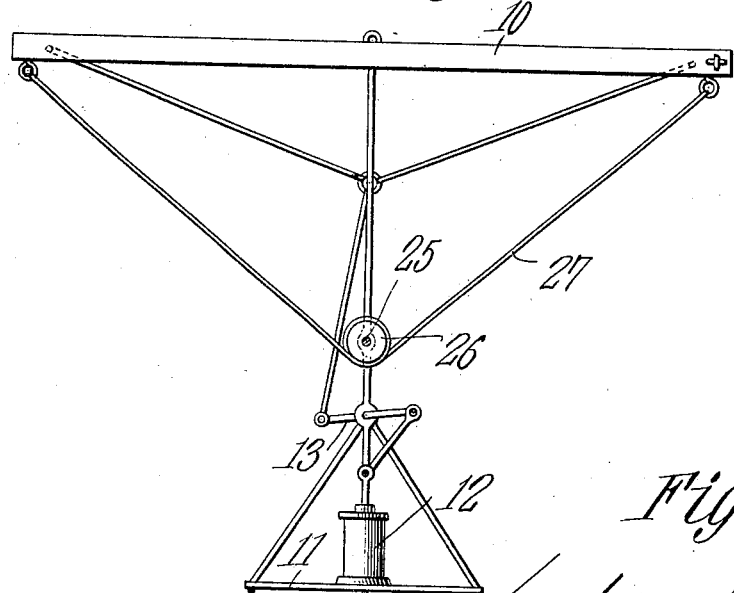
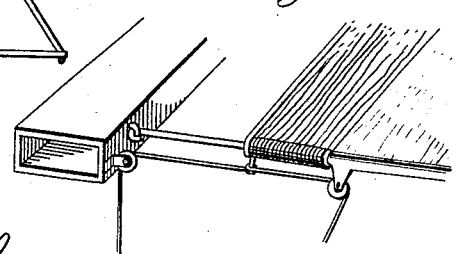
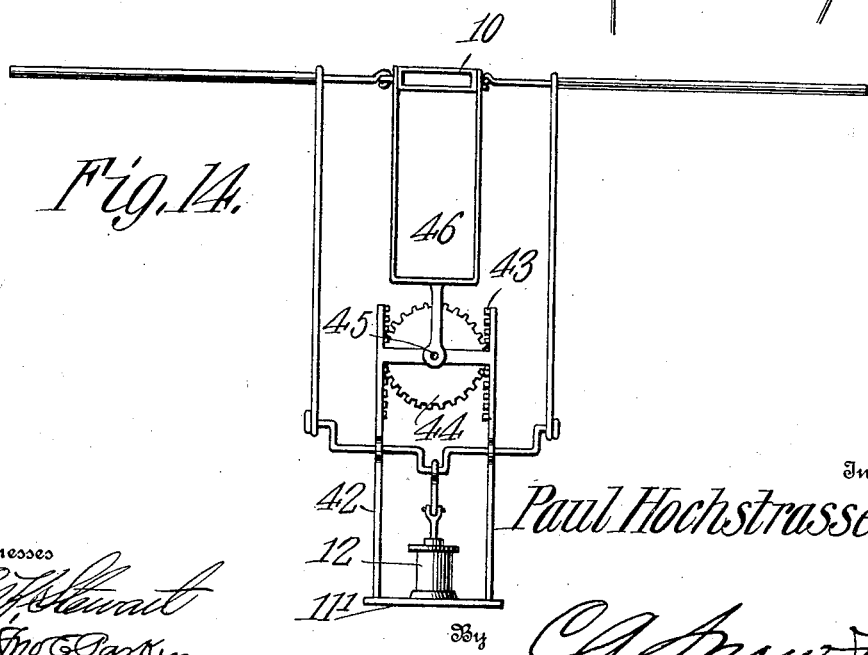
Inventor,
Paul Hochstrasser.

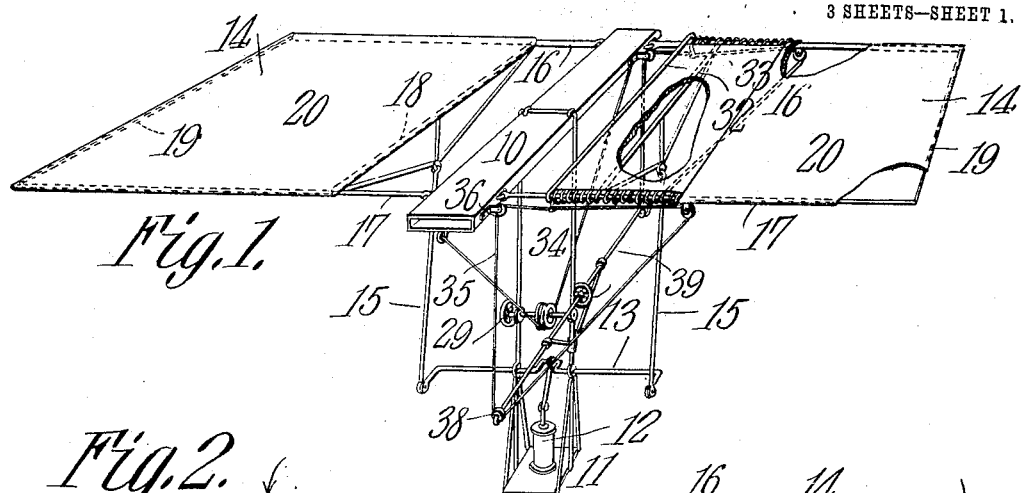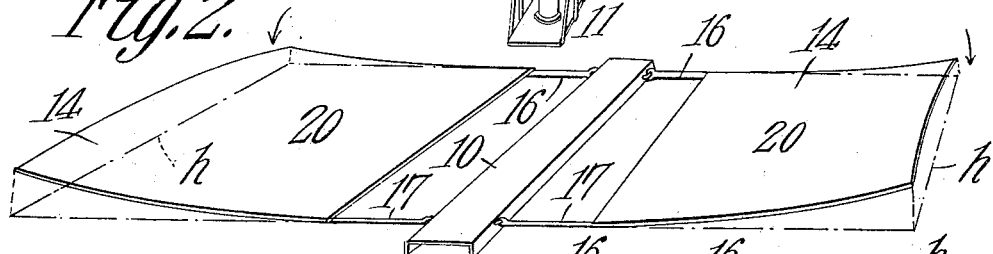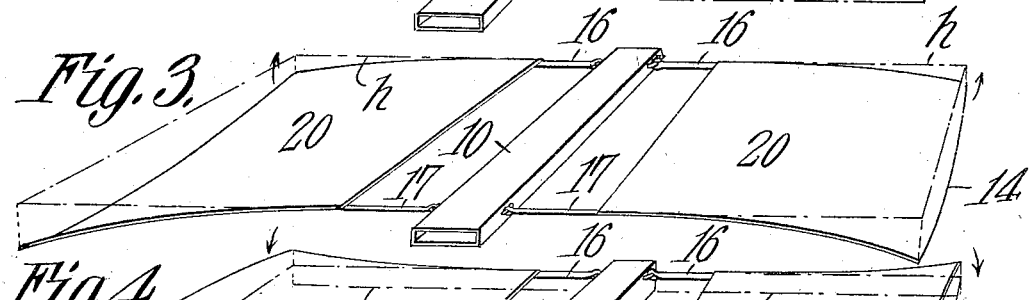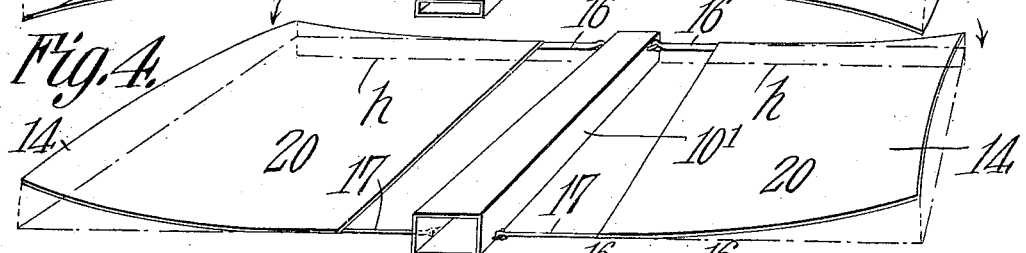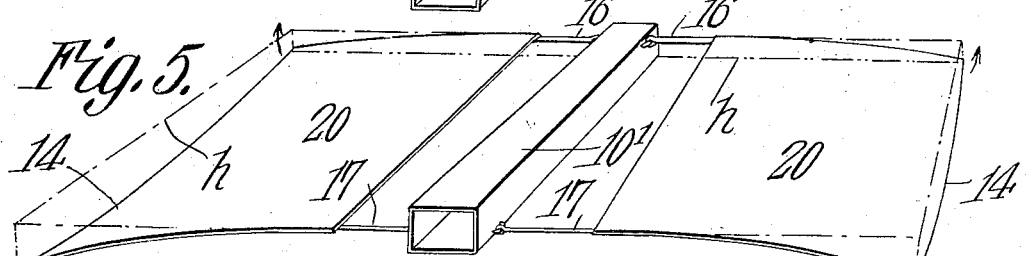

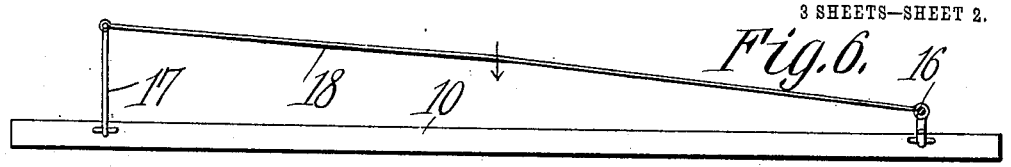
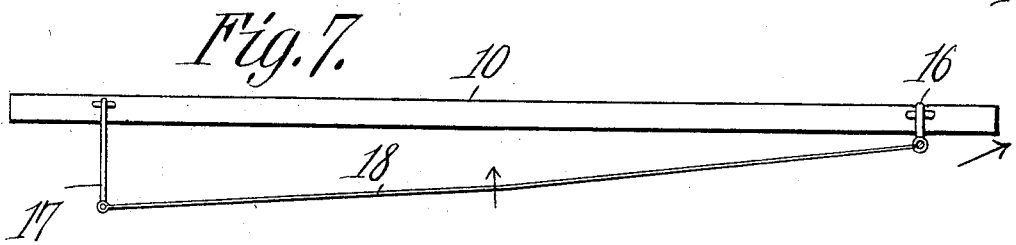
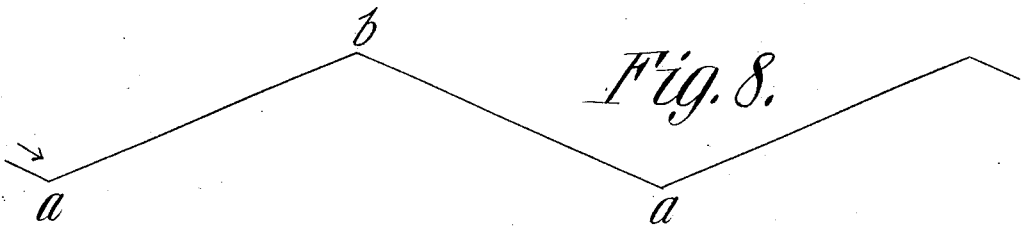
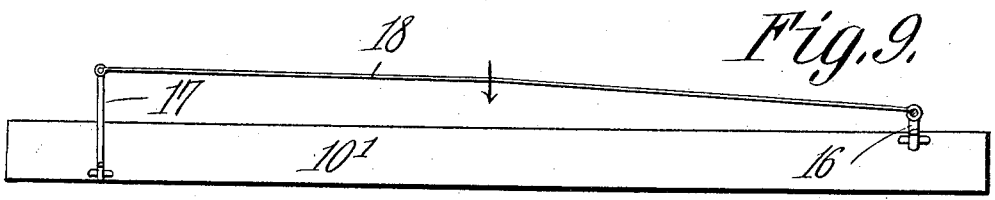
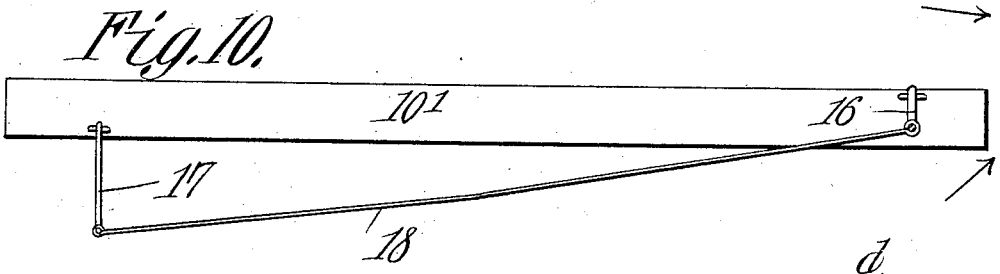

UNITED STATES PATENT OFFICE.

PAUL HOCHSTRASSER, OF SALT LAKE CITY, UTAH.

AIR-SHIP.

No. 910,683.  Specification of Letters Patent.  Patented Jan. 26, 1909.

Application filed July 19, 1907, Serial No. 384,629. Renewed June 11, 1908. Serial No. 437,976.

*To all whom it may concern:*

Be it known that I, PAUL HOCHSTRASSER, a citizen of the United States, residing at Salt Lake City, in the county of Salt Lake and State of Utah, have invented a new and useful Air-Ship, of which the following is a specification.

This invention relates to flying machines or air ships, and has for its principal object to provide a device of this character in which a pair of wings or vanes are employed that are operated on what is believed to be the principle of operation of the wings of birds.

One of the principal objects of the invention is to provide vibrating or flapping wings or vanes of such construction that the forward or advance edges of such wings will always travel on both up and down strokes in advance of the rear edges thereof, the forward edge of each wing being much stiffer or more rigid than the rear edge, and in this respect resembling the usual structure of a bird's wing where the bony portion is at the front, while the rear is made up of more yieldable cartilage or tendons.

A still further object of the invention is to provide a winged structure in which the wings are so mounted and constructed that on each upward movement there will be a tendency to rise and move forward and on each downward movement a tendency to descend and move forward, and in this connection a further object is to so mount the wings that the gain on the ascending stroke will more than counter-balance the loss on the descending stroke, so that by a simple vibration or flapping of the wings, the structure is caused to rise.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a perspective view of an air ship or flying machine constructed in accordance with the invention, part of one of the wings being broken away to more clearly illustrate the construction. Fig. 2 is a perspective diagram of the two wings on the downward stroke. Fig. 3 is a similar view of the wings on the up stroke. Fig. 4 is a perspective view showing the preferred method of mounting the wings, the latter being shown on the down stroke. Fig. 5 is a similar view showing the wings on an up stroke. Figs. 6 to 11 inclusive are diagrams, more specifically referred to hereinafter. Fig. 12 is a longitudinal sectional view of the machine. Fig. 13 is a detail perspective view of a portion of the machine showing more particularly the adjustable wing. Fig. 14 is an end view illustrating a slight modification.

Similar numerals of reference are employed to indicate corresponding parts throughout the several figures of the drawings.

In the drawings, 10 designates the central body of the flying machine or air ship, this in the present instance being shown merely in the form of a hollow rectangular structure of the least possible weight, and of the box-kite type. From the central portion of this member 10 is suspended a platform 11 carrying an engine 12 which operates a crank shaft 13, and this crank shaft operates the wings 14 through the medium of pitman rods 15, so that both wings move in unison. Each wing is made up of a forward arm 16 and rear arm 17 and two cross bars 18 and 19, of which the cross bar 18 may be placed at any distance from the member 10. The two arms 16 and 17 are pivoted or in any other suitable manner articulated to the structure 10, and the arm 16 is stiffer or more rigid than the arm 17, which may be accomplished by making one arm of greater diameter than the other, or by making one of greater length than the other, or by making the arms of different material, but in all cases the arm 16 is the most rigid and constitutes the forward edge of the wing corresponding in this respect to the bony structure of a bird's wing. The rod 18 is rigid and forms such a connection between the two arms that the latter move in unison at the pivot point. The outer rod 19 is freely flexible, and it may, if necessary, be formed of a wire. The space between the arms and rods is covered by a sheet 20 of oiled silk or other fabric, or leather, or it may be formed of aluminum or any other light sheet material.

As a result of the construction of the wings, the arm 16 will always move in advance of the arm 17 on both the ascending and descending strokes, and on referring to Figs. 2 and 6 which illustrate the descending stroke, it will be seen that the arm 16 is moving in advance of the arm 17 and will pass the horizontal plane indicated by the dotted line $h$ in advance of the arm 17, so that the wing will be held at an angle to the horizontal. This results in a downward gliding movement toward the point $a$ of Fig. 8. Before the arm 17 approaches the plane of the arm 16, the wing is started on the up stroke, as shown in Figs. 3 and 7, where the up stroke is progressing, and in this case, also, the arm 16 is in advance of the arm 17 and will approach the horizontal plane more quickly than the arm 17. During this up stroke there will be a tendency to draw in a body of air under the forward portion of the wing, which will create a current along the lower surface of the wing, and on which the wing will ascend during the up stroke which will be from the point $a$ to the point $b$ of Fig. 8. On the next down stroke, the arm 16 will again be in advance of the arm 17, and the tendency will be forward and downward from the point $b$ to the point $a$, and this movement will continue without perceptible gain in elevation, as has been found in actual tests in both air and water. For successful flight, therefore, it becomes necessary to so arrange the wings as to gain perceptibly on the up stroke, and this is accomplished by arranging the pivotal connections of the arms 16 in a plane above the connections of the arms 17 which may be accomplished by changing the center of gravity of the member 10 in order to present the latter at any desired angle to the horizontal. This result, however, may be accomplished while still maintaining the member 10 in a horizontal plane by pivoting the arms in the manner shown in Figs. 4 and 5. In this case the vertical height of the member 10' is increased and the arms 16 are pivoted near the top of said member, while the arms 17 are pivoted near the bottom thereof, thus giving the wings an initial angle which will result in securing the desired rise during flight.

In Figs. 4 and 9 one of the wings is shown as on the down stroke, and in Fig. 10 is the same wing shown as on the up stroke. It will be noted, however, that the angle of the wing to the horizontal on the down stroke is less than that on the up stroke, so that considering the wing as a simple plane, the angle of descent is less than the angle of ascent, so that other things being equal the flight will be, on the up stroke, from $c$ to $d$ of Fig. 11, and on the down stroke from $d$ to $c$, thus gaining in elevating at each up stroke.

In order to vary the angular position of the member 10 and the wings, the pendent frame is provided with a shaft 25 on which is secured a drum 26, and around this drum is coiled the central portion of a cord 27, the opposite ends of which are attached to the end portions of the body frame of the machine. The shaft is provided with a hand wheel 29 which may be turned for the purpose of rotating the shaft and drum, and thus winding up one end of the cord and releasing the opposite end in order to vary the angle of the body to the horizontal.

To provide for steering, that is to say, to enable the machine to go to the right or to the left, provision is made for adjusting the area of the front of the wings. In this case the wing at the right of Fig. 1 is shown as adjustable, the inner edge of the silk or other sheet material being secured to a bar 32 that is slidably mounted on the arms 16 and 17, and the opposite ends of the inner portion of the sheet are connected to clips 33 that are slidably mounted in the arms 16 and 17, so that by moving the rod 32 toward and from the central member 10, the area of the wing at the right may be made greater or less than the area of the wing at the left, and thus render it either more or less effective than the left wing, so that the machine will turn to the left or to the right, as the case may be. To accomplish this adjustment, the ends of the rod 32 are provided with pendent pins 34 which are connected to cords 35 that are guided over small sheaves 36, the sheaves being carried by the central body 10 and by the arms 16, 17. The cords also pass over pulleys 38 that are carried by a shaft 39 journaled in the lower frame and provided with a hand wheel 40 that preferably is disposed within convenient reach of the platform 11. By turning this hand wheel 40 and the shaft, the two cords 35 may be simultaneously adjusted and the bar 32 moved toward or from the central frame member 10, so that the area of the wing may be adjusted in accordance with the direction in which the machine is to travel.

The material with which the wings are covered is such that it may be simply gathered together when the area of a wing is decreased, and being stretched from front to rear, the gathers or folds will not belly out as the wing is operated. The same effect may be gained by altering the center of gravity transversely of the machine, as shown, for instance, in Fig. 14, where the lower platform 11' is carried by a pendent frame 42. The upper ends of the two frame members are provided with rack teeth 43 that are engaged by a gear 44, the gear being mounted on a shaft 45 that is journaled in the frame 46 depending from the central body 10. By turning this shaft the platform may be shifted to assume a greater or less angle to the transverse plane of the body portion 10, and by thus shifting the center of gravity, the machine may be directed in the proper course.

I claim:—

1. In a flying machine, a pair of wings, each including front and rear arms, a flexible member connecting the tips of the front and rear arms, the front arm being more rigid than the rear arm, and arranged to move in advance of such rear arm in both the upward and downward strokes, a covering between the arms, and means for simultaneously actuating the wings.

2. In a flying machine, a pair of wings, each including a front arm and a rear arm, the front arm being more rigid than the rear arm, a rigid cross bar connecting the inner ends of the arms, a flexible member connecting the outer ends or tips of the arms, a sheet covering between the arms, and means for simultaneously operating the wings.

3. A flying machine including a central member, and wings pivoted thereto, each wing including front and rear arms, the front arms being more rigid than the rear arms, and the pivotal connections of the front arms being in a horizontal plane above the pivotal connections of the rear arms.

4. In a machine of the class described, a central frame member, a pair of wings, each including a frame and a covering, a rod connected to the edge of the covering of one of said wings, a pair of cords connected to the ends of the rod, means for guiding the cords, a shaft, pulleys arranged on the shaft and around which the cords pass, and an adjusting hand wheel carried by said shaft.

In testimony that I claim the foregoing as my own, I have hereto affixed my signature in the presence of two witnesses.

PAUL HOCHSTRASSER.

Witnesses:
　CALVIN L. PRICE,
　ALBERT TORONTO.